US009884531B2

(12) United States Patent
Watanabe et al.

(10) Patent No.: US 9,884,531 B2
(45) Date of Patent: Feb. 6, 2018

(54) AUTOMOBILE UNDERCARRIAGE COMPONENT

(71) Applicant: KOBE STEEL, LTD., Kobe-shi (JP)

(72) Inventors: Hiroaki Watanabe, Inabe (JP); Keita Okada, Inabe (JP); Hiroaki Hosoi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/106,034

(22) PCT Filed: Dec. 9, 2014

(86) PCT No.: PCT/JP2014/082552
§ 371 (c)(1),
(2) Date: Jun. 17, 2016

(87) PCT Pub. No.: WO2015/093346
PCT Pub. Date: Jun. 25, 2015

(65) Prior Publication Data
US 2016/0318362 A1 Nov. 3, 2016

(30) Foreign Application Priority Data

Dec. 19, 2013 (JP) .................................. 2013-262927
Oct. 15, 2014 (JP) .................................. 2014-210762

(51) Int. Cl.
B60G 7/00 (2006.01)
B60G 3/04 (2006.01)
(Continued)

(52) U.S. Cl.
CPC .............. B60G 7/001 (2013.01); B60G 3/04 (2013.01); B21J 5/02 (2013.01); B21K 1/26 (2013.01);
(Continued)

(58) Field of Classification Search
CPC combination set(s) only.
See application file for complete search history.

(56) References Cited

U.S. PATENT DOCUMENTS 6,113,058 A * 9/2000 Iwasaki .................. B60G 7/001
248/678
8,651,504 B2 * 2/2014 Gerhards ............... B60G 7/001
280/124.134
(Continued)

FOREIGN PATENT DOCUMENTS

CN 102248100 A 11/2011
FR 2991611 A1 * 12/2013 ............. B60G 7/001
(Continued)

OTHER PUBLICATIONS

International Search Report and Written Opinion of the International Searching Authority dated Feb. 10, 2015 in PCT/JP2014/062552 Filed Dec. 9, 2014.

Primary Examiner — Nicole T Verley
(74) Attorney, Agent, or Firm — Oblon, McClelland, Maier & Neustadt, L.L.P.

(57) ABSTRACT

An automobile undercarriage component is provided with a web and a rib. The rib is configured so as to comprise a first section that is a section having the widest width and a second section that has a narrower width than the first section, and the second section having a narrower rib width than the first section as a result of an inner wall surface of the second section that is continuously formed from the web being provided so as to be adjacent to a facing outer surface wall.

10 Claims, 9 Drawing Sheets

(51) Int. Cl.
*B21K 1/26* (2006.01)
*B21J 5/02* (2006.01)

(52) U.S. Cl.
CPC .............. *B60G 2200/1424* (2013.01); *B60G 2206/014* (2013.01); *B60G 2206/016* (2013.01); *B60G 2206/12* (2013.01); *B60G 2206/122* (2013.01); *B60G 2206/7102* (2013.01); *B60G 2206/8101* (2013.01); *B60G 2206/81022* (2013.01)

(56) References Cited

U.S. PATENT DOCUMENTS

| | | | | |
|---|---|---|---|---|
| 8,870,205 | B2* | 10/2014 | Corby | B60G 3/06 180/274 |
| 8,961,714 | B2* | 2/2015 | Sakamoto | B21J 1/06 148/415 |
| 9,168,801 | B2* | 10/2015 | Dicke | B60G 7/001 |
| 9,186,943 | B2* | 11/2015 | Hosoi | B60G 7/001 |
| 9,278,595 | B2* | 3/2016 | Ohta | B60G 7/02 |
| 9,481,920 | B2* | 11/2016 | Hori | B21J 1/06 |
| 9,527,369 | B2* | 12/2016 | Sakamoto | B21J 1/06 |
| 9,561,699 | B2* | 2/2017 | Haselhorst | B60G 7/001 |
| 2009/0000705 | A1* | 1/2009 | Nakai | B21K 1/12 148/550 |
| 2009/0008891 | A1* | 1/2009 | Jang | B60G 7/001 280/124.134 |
| 2011/0115186 | A1* | 5/2011 | Chiku | B60G 7/001 280/124.134 |
| 2011/0127743 | A1* | 6/2011 | Musha | B23K 31/00 280/124.1 |
| 2011/0221151 | A1* | 9/2011 | Sakamoto | B21J 1/06 280/124.1 |
| 2013/0239412 | A1 | 9/2013 | Sakamoto et al. | |
| 2014/0210177 | A1* | 7/2014 | Dicke | B60G 7/001 280/124.134 |
| 2015/0001826 | A1* | 1/2015 | Hosoi | B60G 7/001 280/124.134 |
| 2015/0283595 | A1* | 10/2015 | Haselhorst | B21D 53/88 156/196 |
| 2016/0090122 | A1* | 3/2016 | Conner | B60G 7/001 280/93.512 |
| 2016/0347138 | A1* | 12/2016 | Suzuki | B60G 7/02 |

FOREIGN PATENT DOCUMENTS

| | | | |
|---|---|---|---|
| JP | 2003226124 A | * | 8/2003 |
| JP | 2011-189851 A | | 9/2011 |

* cited by examiner

AUTOMOBILE UNDERCARRIAGE COMPONENT

TECHNICAL FIELD

The present invention relates to an automobile undercarriage component such as an automobile suspension arm including, for example, a lower arm, an upper arm, a knuckle, and a link.

BACKGROUND ART

Transportation equipment emits $CO_2$ and other greenhouse gases. Therefore, efforts are being made to provide increased fuel efficiency based on various means in order to prevent global warming. Particularly automobiles account for the great majority of the transportation equipment. Therefore, it is highly demanded that the automobiles provide increased fuel efficiency. As such being the case, researches and commercialization are being made to provide increased fuel efficiency by reducing the weight of automobile bodies and making full use of hybrid technologies.

A comfortable ride in an automobile depends, for example, on unsprung weight. More specifically if the unsprung weight, that is, the total weight of unsprung components such as suspensions, tires, and wheel rims, is small, the suspensions react properly to provide a comfortable ride. If, by contrast, the unsprung weight is great, the suspensions react improperly to provide degraded ride quality.

In order to maintain a comfortable ride in an automobile and provide increased fuel efficiency based on automobile body weight reduction, it is necessary to not only reduce the weight of the whole automobile body by reducing the weight of a body and other parts positioned above the suspensions, but also reduce the weight of an automobile undercarriage component positioned below springs.

Some technologies have been proposed in order to reduce the weight of an automobile undercarriage component. An automobile undercarriage component formed of an aluminum alloy having a through-hole is disclosed, for instance, in Patent Literature 1. A normal portion of the automobile undercarriage component, which is without coarsened crystal grains, has a yield stress of 270 MPa or higher, and the minimum length between the end of a rib portion, which is a predetermined portion of a rib that is positioned toward the through-hole, and the end of a through-hole portion, which is a predetermined portion of a web that is positioned toward the through-hole, is 6 mm or more.

CITATION LIST

Patent Literature

Patent Literature 1: Japanese Unexamined Patent Application Publication No. 2011-189851

SUMMARY OF INVENTION

Technical Problem

According to the technology disclosed in Patent Literature 1, a certain weight reduction effect can be achieved by making a through-hole in a predetermined portion of an automobile undercarriage component. However, there is still a strong need for reducing the weight of an automobile undercarriage component. Thus, it is demanded that a technology for achieving further weight reduction be developed from a viewpoint different from that of the technology disclosed in Patent Literature 1.

When conventional technologies including the technology disclosed in Patent Literature 1 were applied, a rib for the automobile undercarriage component was formed to have a fixed width.

Additionally, the automobile undercarriage component supports most of the weight of an automobile. Therefore, the automobile undercarriage component will not be properly designed simply by reducing its weight. The automobile undercarriage component needs to be provided in such a manner as to suppress a decrease in strength and rigidity and meet durability and other requirements.

In view of the above circumstances, an object of the present invention is to provide an automobile undercarriage component that suppresses a decrease in strength and rigidity and contributes to weight reduction.

Solution to Problem

To solve the above problem, the inventors of the present invention have created the automobile undercarriage component by considering its structural features and weight reduction and conducting a close examination, for example, of the relationship between strength and the modulus of section and the relationship between rigidity and second moment of area.

More specifically the automobile undercarriage component according to the present invention includes a web and a rib. The rib includes a first section having the greatest width and a second section having a smaller width than the first section. The second section has a smaller width than the first section because an inner wall surface formed continuously from the web is disposed in proximity to an opposing outer wall surface.

According to the automobile undercarriage component, the second section of the rib has a smaller width than the first section because the second section is formed so that the inner wall surface is disposed in proximity to the outer wall surface. Thus, weight reduction is achieved by the amount of decrease in the width of the second section. Further, according to the automobile undercarriage component, weight reduction is achieved by disposing the inner wall surface of the second section of the rib in proximity to the outer wall surface. This eliminates the necessity of decreasing the width of an arm. Thus, a significant decrease in the modulus of section and the value of the second moment of area is suppressed. As a result, a decrease in the strength and rigidity of the automobile undercarriage component is suppressed. In other words, the automobile undercarriage component makes it possible to suppress a decrease in strength and rigidity and achieve weight reduction in marked contrast from a conventional automobile undercarriage component having a rib whose width is fixed.

The automobile undercarriage component according to the present invention is preferably configured so that the first section includes a first inner wall surface and a first outer wall surface. The first inner wall surface is formed continuously from the web. The first outer wall surface faces the first inner wall surface. The first inner wall surface has an inclination angle θ of θa (°). An angular portion formed on the leading end of the first inner wall surface has a curvature radius R of Ra (mm). The first outer wall surface has an inclination angle θ of θb (°). An angular portion formed on the leading end of the first outer wall surface has a curvature radius R of Rb (mm). A planar portion formed between the two angular portions has a width of ws (mm). Additionally the automobile undercarriage component according to the present invention is preferably configured so that the second section includes a second inner wall surface and a second outer wall surface. The second inner wall surface is the inner wall surface. The second outer wall surface is the outer wall surface. The second inner wall surface has an inclination angle θ of θa' (°). An angular portion formed on the leading end of the second inner wall surface has a curvature radius R of Ra (mm). The second outer wall surface has an inclination angle θ of θb' (°). An angular portion formed on the leading end of the second outer wall surface has a curvature radius R of Rb' (mm). A planar portion formed between the two angular portions has a width of ws' (mm). Let us assume that wa, wb, wa', and wb' are defined as expressed by Equation 1 below.

$$wa = Ra \times \cos\theta a - (Ra - Ra \times \sin\theta a) \times \tan\theta a$$

$$wb = Rb \times \cos\theta b - (Rb - Rb \times \sin\theta b) \times \tan\theta b$$

$$wa' = Ra' \times \cos\theta a' - (Ra' - Ra' \times \sin\theta a') \times \tan\theta a'$$

$$wb' = Rb' \times \cos\theta b' - (Rb' - Rb' \times \sin\theta b') \times \tan\theta b' \quad \text{[Equation 1]}$$

The difference L (mm) in width between the first section and the second section is then expressed by Equation 2 below.

$$L = \{(wa - wa') \pm (wb - wb') + (ws' - ws)\} \quad \text{[Equation 2]}$$

Additionally it is preferred that L>0.

According to the automobile undercarriage component, when the difference L in width between the first section and the second section is defined by using, for example, the curvature radius R of the angular portion of the rib and the inclination angle θ of the wall surface, weight reduction can be certainly achieved based on the structural features (for example R and θ) of the rib.

Further, the automobile undercarriage component according to the present invention is preferably configured so that the angular portions have a curvature radius R of 1 to 10 mm.

According to the automobile undercarriage component, when the curvature radius R of the angular portions is defined to be within a predetermined range, proper manufacture can be achieved so that the manufactured automobile undercarriage component will be more suitable for actual applications.

Furthermore, the automobile undercarriage component according to the present invention is preferably configured so that when the rib has a height of h (mm) and the smaller curvature radius R of the two angular portions of the rib is R (mm), h<(5R+40).

According to the automobile undercarriage component, when the upper limit of the height h of the rib is defined by using the curvature radius R of the angular portion of the rib, it is possible to reduce the possibility of an angular portion of a die being cracked in a situation where the automobile undercarriage component having the rib is press-formed by using the die.

The width of the rib cannot be made smaller than the sum of the curvature radii R of the two angular portions of the rib. Therefore, weight reduction can be achieved by decreasing the curvature radii R of the two angular portions. In the past, the curvature radii R of the two angular portions were determined without considering the height of the rib. However, the automobile undercarriage component according to the present invention makes it possible to determine the minimum curvature radii R of the angular portions of the rib in accordance with a demanded rib height. As a result, further weight reduction can be achieved by decreasing the width of the rib while producing the aforementioned effect (reducing the possibility of an angular portion of a die being cracked).

Moreover, the automobile undercarriage component according to the present invention is preferably configured so that the width ws of the planar portion of the first section and the width ws' of the planar portion of the second section are both less than 2 mm.

The automobile undercarriage component makes it possible to certainly achieve weight reduction.

Additionally the automobile undercarriage component according to the present invention is preferably formed of an aluminum alloy.

When the automobile undercarriage component is formed of an aluminum alloy, it is possible to not only achieve further weight reduction, but also manufacture an automobile undercarriage component that is more suitable for actual applications.

Advantageous Effects of Invention

The automobile undercarriage component according to the present invention is configured so that the inner wall surface of the second section of the rib is disposed in proximity to the outer wall surface. Thus, the second section has a smaller width than the first section. Therefore, weight reduction can be achieved by the amount of decrease in the width.

Further, the weight of the automobile undercarriage component according to the present invention is reduced by disposing the inner wall surface of the second section of the rib in proximity to the outer wall surface. This eliminates the necessity of decreasing the width of the arm. Thus, a significant decrease in the modulus of section and the value of the second moment of area is suppressed.

As a result, a decrease in the strength and rigidity of the automobile undercarriage component can be suppressed.

DESCRIPTION OF EMBODIMENTS

Embodiments according to the present invention of an automobile undercarriage component and of a method of manufacturing the automobile undercarriage component will now be described in detail with reference to the accompanying drawings.

First of all, an overall configuration of the automobile undercarriage component according to an embodiment of the present invention will be described with reference to FIGS. 1 and 2.

[Automobile Undercarriage Component]

The automobile undercarriage component (hereinafter referred to, as appropriate, as the "undercarriage component") 10 is a component used for an automobile undercarriage, such as a suspension arm including, for example, a lower arm, an upper arm, a knuckle, and a link. Here, the upper arm illustrated in FIGS. 1 and 2 will be used to describe the undercarriage component 10.

Figure 1:
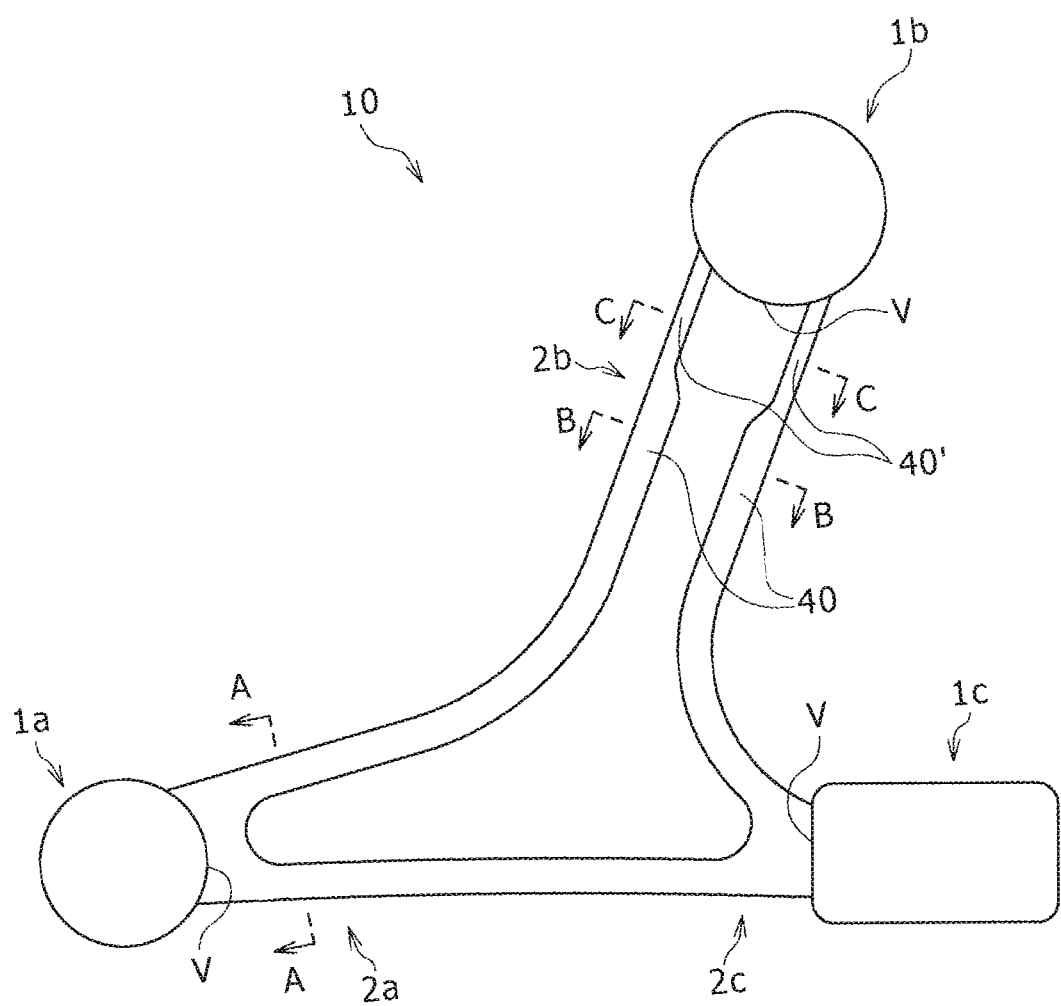
FIG. 1 is a schematic diagram illustrating an automobile undercarriage component according to an embodiment of the present invention.
Figure 2:
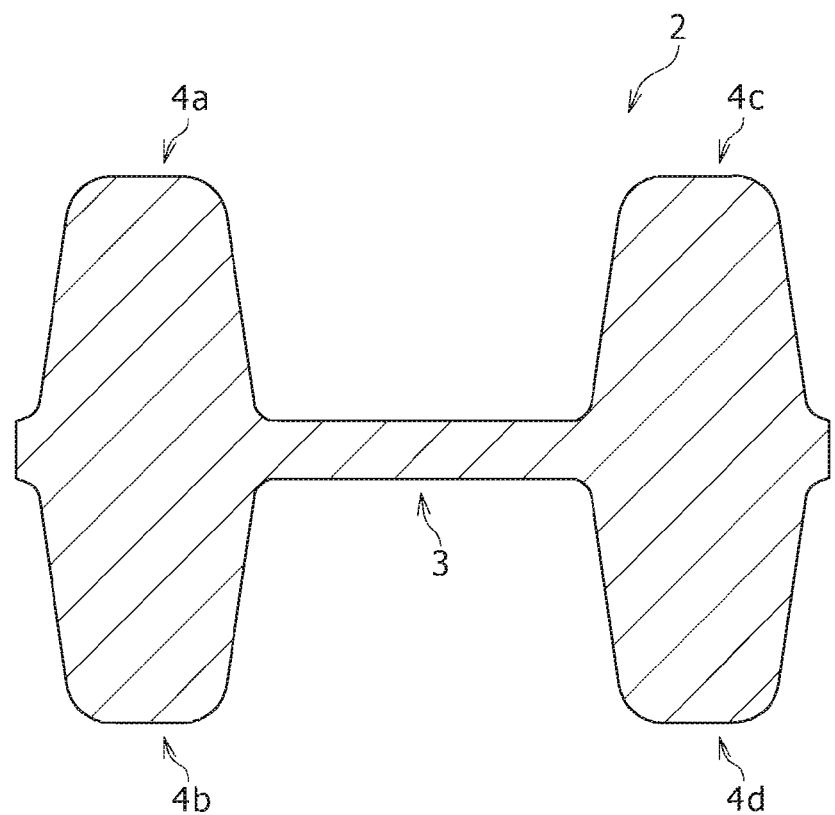
FIG. 2 is a cross-sectional view of an arm of the automobile undercarriage component according to the embodiment of the present invention as taken along line A-A of FIG. 1.

As illustrated in FIG. 1, the undercarriage component 10 includes three bosses 1 (1a, 1b, 1c) and three arms 2 (2a, 2b, 2c). The arms 2 are used to join the bosses 1. As illustrated in FIG. 2, the arms 2 each include a web 3 and ribs 4. The web 3 has a predetermined width. Each of the ribs 4 protrudes from the surface (the surface of a rim of the web 3) of the web 3 and extends in a longitudinal direction. More specifically, a total of four ribs 4 (4a, 4b, 4c, 4d) protrude from both sides of the web 3. Referring to FIGS. 1 and 2, the web 3 is continuously formed between the ribs 4. Alternatively, however, a hole (through-hole) may be made in the web 3 for weight reduction. Further, the material for the undercarriage component 10 is not specifically limited; however, the undercarriage component 10 is preferably formed of an aluminum alloy, which is excellent from the viewpoint of weight reduction.

Each of the bosses 1 is a thick member (protrusion member) into which a bushing or the like is to be fitted or with which a bushing or the like is to be combined. Each of the arms 2 is a member that is disposed between the bosses 1 to join them. As mentioned earlier, each arm 2 includes the web 3, which is thin, and the ribs 4, which reinforce the web 3.

Figure 10:
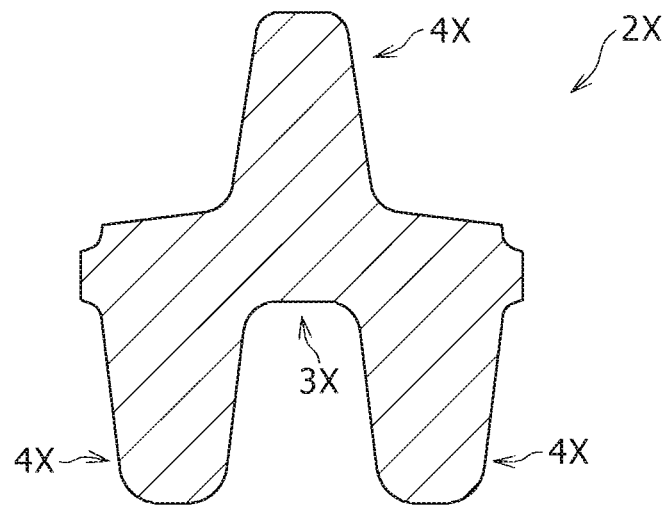
FIG. 10 is a cross-sectional view illustrating the arm of the automobile undercarriage component according to an embodiment (modification) of the present invention.
Figure 11:
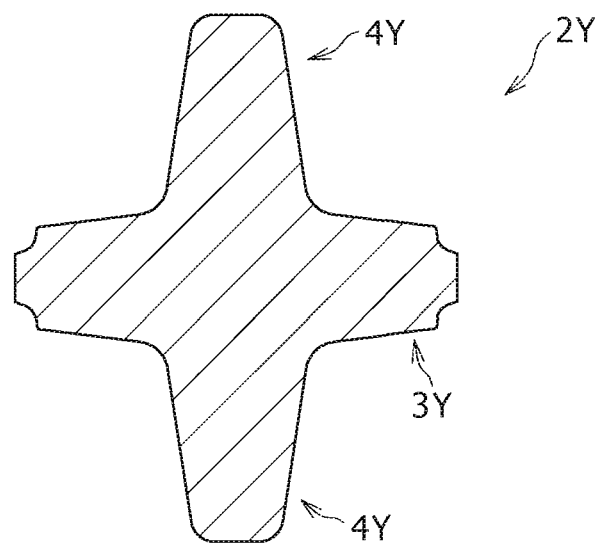
FIG. 11 is a cross-sectional view illustrating the arm of the automobile undercarriage component according to an embodiment (modification) of the present invention.
Figure 12:
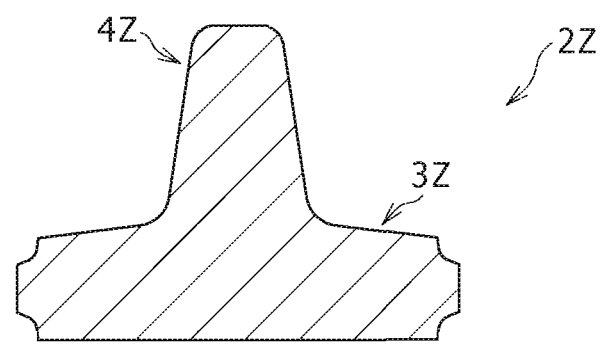
FIG. 12 is a cross-sectional view illustrating the arm of the automobile undercarriage component according to an embodiment (modification) of the present invention.

Arms 2 having various structures exist. For example, in addition to an arm having the above-described structure, there exists, as illustrated in FIG. 10, an arm 2X that has a cross-sectional shape and includes a rib 4X protruding from the center of the upper surface of a web 3X and a rib 4X protruding from both ends of the lower surface of the web 3X. Further, as illustrated in FIG. 11, there exists an arm 2Y that has a cross-sectional shape and includes a rib 4Y protruding from the center of both surfaces of a web 3Y. Furthermore, as illustrated in FIG. 12, there exists an arm 2Z that has a cross-sectional shape and includes a rib 4Z protruding from the center of the upper surface of a web 3Z. In compliance with strength requirements of a product, the ribs 4 are disposed at an effective position. The present invention is applicable not only to the undercarriage component 10 having the arms 2 structured as described above, but also to other undercarriage components having various structures.

The structure of the ribs 4 will be mainly described below. The structure of particularly the rib 4 near the end V of the boss 1 (see FIG. 1) is significantly affected by the structure of the boss 1, and is therefore unstable in some cases in terms of design. There exists, for example, an undercarriage component having such a structure that the boss 1, the rib 4, and the web 3 are substantially equal in thickness near the end V of the boss 1 due to continuous formation of the boss 1 and the arm 2. In such an instance, the rib 4 according to the present invention is a rib from which a portion close to the end V of the boss 1 is eliminated, that is, a rib from which a portion affected by the structure of the boss 1 is eliminated.

For example, the rib 4 according to the present invention is a rib that is obtained by eliminating a 10-mm portion from the end V of the boss 1. Further, the rib 4 according to the present invention is a rib that is obtained by eliminating a 10-mm portion from the trailing end of the rib 4 (the starting end of the rib 4 included in the arm 2 that is formed to be thicker than the web 3).

The structure of the rib will now be described in detail with reference to FIGS. 3 and 4.

[Structures of First and Second Sections of Rib]

The rib 4 included in the undercarriage component 10 includes a first section 40 and a second section 40'. The first section 40 is the widest section (a cross-section of the rib taken along line B-B of FIG. 1). The second section 40' (a cross-section of the rib taken along line C-C of FIG. 1) is narrower than the first section 40.

Figure 3:
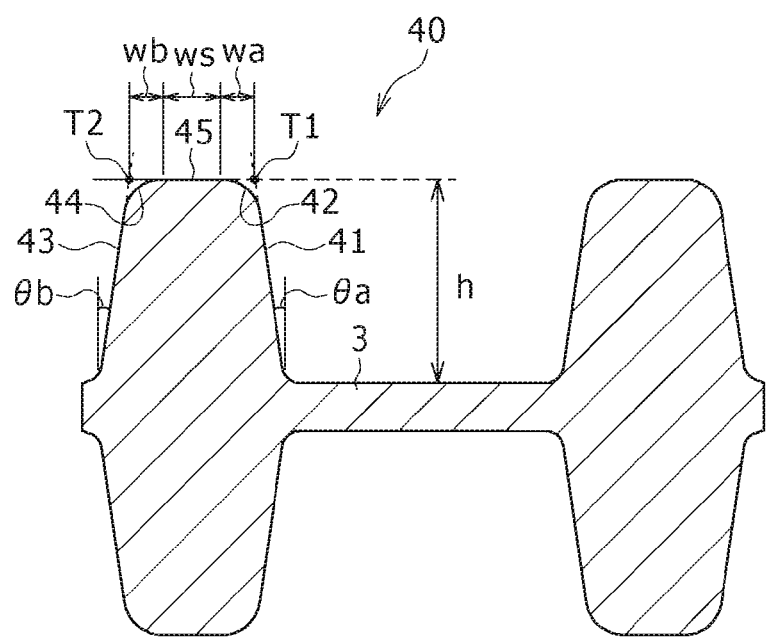
FIG. 3 is a cross-sectional view of the arm of the automobile undercarriage component according to the embodiment of the present invention as taken along line B-B of FIG. 1.

As illustrated in FIG. 3, the first section 40 of the rib 4 includes a first inner wall surface 41 and a first outer wall surface 43. The first inner wall surface 41 is continuously formed from the web 3 in a rising manner. The first outer wall surface 43 is an outer wall surface that faces the first inner wall surface 41.

The first inner wall surface 41 has an inclination angle θ of θa with respect to a direction orthogonal to the web 3. An angular portion 42 formed on the leading end of the first inner wall surface 41 (the leading end oriented in the direction orthogonal to the web 3) has a curvature radius R of Ra.

The first outer wall surface 43 has an inclination angle θ of θb with respect to the direction orthogonal to the web 3. An angular portion 44 formed on the leading end of the first outer wall surface 43 (the leading end oriented in the direction orthogonal to the web 3) has a curvature radius R of Rb.

A planar portion 45 having a width of ws is formed between the angular portion 42 and the angular portion 44. However, the planar portion 45 may be omitted (ws'=0). The inclination angle θa of the first inner wall surface 41 and the inclination angle θb of the first outer wall surface 43 may be either equal (θa=θb) or unequal (θa≠θb). Further, the curvature radius Ra of the angular portion 42 and the curvature radius Rb of the angular portion 44 may be either equal (Ra=Rb) or unequal (Ra≠Rb).

Figure 4:
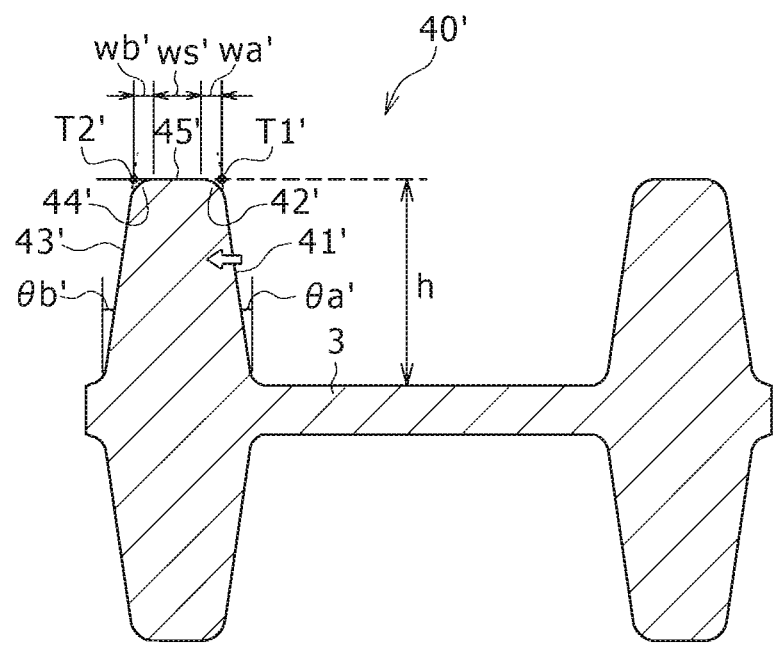
FIG. 4 is a cross-sectional view of the arm of the automobile undercarriage component according to the embodiment of the present invention as taken along line C-C of FIG. 1.

As illustrated in FIG. 4, the second section 40' of the rib 4 includes a second inner wall surface 41' and a second outer wall surface 43'. The second inner wall surface 4r is continuously formed from the web 3 in a rising manner. The second outer wall surface 43' is an outer wall surface that faces the second inner wall surface 41'.

The second inner wall surface 41 has an inclination angle θ of θa' with respect to the direction orthogonal to the web 3. An angular portion 42' formed on the leading end of the second inner wall surface 41' (the leading end oriented in the direction orthogonal to the web 3) has a curvature radius R of Ra'.

The second outer wall surface 43' has an inclination angle θ of θb' with respect to the direction orthogonal to the web 3. An angular portion 44' formed on the leading end of the second outer wall surface 43' (the leading end oriented in the direction orthogonal to the web 3) has a curvature radius R of Rb'.

A planar portion 45' having a width of ws' is formed between the angular portion 42' and the angular portion 44'. However, the planar portion 45' may be omitted (ws'=0).

The inclination angle θa' of the second inner wall surface 41' and the inclination angle θb' of the second outer wall surface 43' may be either equal (θa'=θb') or unequal (θa'≠θb'). Further, the curvature radius Ra' of the angular portion 42' and the curvature radius Rb' of the angular portion 44' may be either equal (Ra'=Rb') or unequal (Ra'≠Rb').

(Width of Rib)

The width w of the first section 40 of the rib 4 is expressed by Equation 3 below.

$$w = wa + wb + ws \quad \text{[Equation 3]}$$

In Equation 3, wa is the distance from the intersection T1 between the tangent line of the planar portion 45 and the tangent line of the first inner wall surface 41 to the boundary between the planar portion 45 and the angular portion 42.

Further, wa can be expressed by Equation 4 below in which the curvature radius Ra of the angular portion 42 and the inclination angle θa of the first inner wall surface 41 are used.

$$wa = Ra \times \cos\theta a - (Ra - Ra \times \sin\theta a) \times \tan\theta a \quad \text{[Equation 4]}$$

Meanwhile, wb is the distance from the intersection T2 between the tangent line of the planar portion 45 and the tangent line of the first outer wall surface 43 to the boundary between the planar portion 45 and the angular portion 44.

Further, when the curvature radius Rb of the angular portion 44 and the inclination angle θb of the first outer wall surface 43 are used, wb can be expressed by Equation 5 below.

$$wb = Rb \times \cos\theta b - (Rb - Rb \times \sin\theta b) \times \tan\theta b \quad \text{[Equation 5]}$$

The width w' of the second section 40' of the rib 4 is expressed by Equation 6 below.

$$w' = wa' - wb' + ws' \quad \text{[Equation 6]}$$

In Equation 6, wa' is the distance from the intersection T1' between the tangent line of the planar portion 45' and the tangent line of the second inner wall surface 41' to the boundary between the planar portion 45' and the angular portion 42'. Further, when the curvature radius Ra' of the angular portion 42' and the inclination angle θa' of the second inner wall surface 41' are used, wa' can be expressed by Equation 7 below.

$$wa' = Ra' \times \cos\theta a' - (Ra' - Ra' \times \sin\theta a) \tan\theta a' \quad \text{[Equation 7]}$$

Meanwhile, wb' is the distance from the intersection T2' between the tangent line of the planar portion 45' and the tangent line of the second outer wall surface 43' to the boundary between the planar portion 45 and the angular portion 44'.

Further, wb' can be expressed by Equation 8 below in which the curvature radius Rb' of the angular portion 44' and the inclination angle θb' of the second outer wall surface 43' are used.

$$wb' = Rb' \times \cos\theta b' - (Rb' - Rb' \times \sin\theta b') \times \tan\theta b' \quad \text{[Equation 8]}$$

The width ws of the planar portion 45 of the first section 40 of the rib 4 and the width ws' of the planar portion 45' of the second section 40' are preferably less than 2 mm. The reason is that when the widths ws, ws' of the planar portions are less than 2 mm, the width w of the first section 40 of the rib 4 and the width w' of the second section 40' can be adequately decreased to certainly achieve weight reduction.

(Proximity Distance L)

The second section 40' is disposed so that the second inner wall surface 41' is in proximity to the second outer wall surface 43'. Therefore, the second section 40' is narrower than the first section 40 by L (mm). Namely the width difference between the first section 40 and the second section 40' is L (mm).

The value L is obtained by subtracting the width w' of the second section 40' from the width w of the first section 40 (L=w−w') and expressed by Equation 9 below.

$$L = \{(wa - wa') + (wb - wb') + (ws' - ws')\} \quad \text{[Equation 9]}$$

Figure 5:
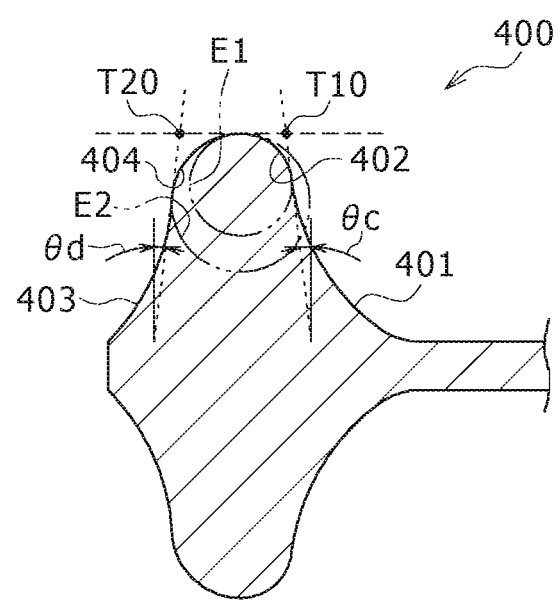
FIG. 5 is a cross-sectional view of a rib of the automobile undercarriage component according to an embodiment (modification) of the present invention.

As described above, the second inner wall surface 41' of the second section 40 of the rib 4 is disposed in closer proximity to the second outer wall surface 43' by L. Therefore, the overall weight of the undercarriage component can be reduced by such proximity A certain rib 400 illustrated, for instance, in FIG. 5 has no planar portion formed on its leading end. No planar portion exists on an inner wall surface 401 and an outer wall surface 403. An intersection T10 of such a rib 400 may be determined as the intersection between the tangent line of a vertex (a point farthest from the web 3 in the direction orthogonal to the web 3) of the rib 400 and the tangent line of an approximate circle E1 corresponding to an angular portion 402 more specifically the tangent line of the approximate circle E1 at a point where the approximate circle E1 leaves the inner wall surface 401). The inclination angle θc of the inner wall surface 401 may be determined as the inclination angle of the tangent line of the aforementioned approximate circle E1.

Further, an intersection T20 of the rib 400 may be determined as the intersection between the tangent line of the vertex of the rib 400 and the tangent line of an approximate circle E2 corresponding to an angular portion 404. The inclination angle θd of the outer wall surface 403 may be determined as the inclination angle of the tangent line of the aforementioned approximate circle E2.

The magnitude of an angle R can be measured, for example, with an R-gauge, a noncontact three-dimensional scanner, or a contact three-dimensional measuring instrument. The inclination angle can be measured, for example, with a noncontact three-dimensional scanner or a contact three-dimensional measuring instrument.

It should be noted that at least one rib (a rib disposed between the bosses 1) may include the first section 40 and the second section 40' as illustrated in FIG. 1.

Figure 13:
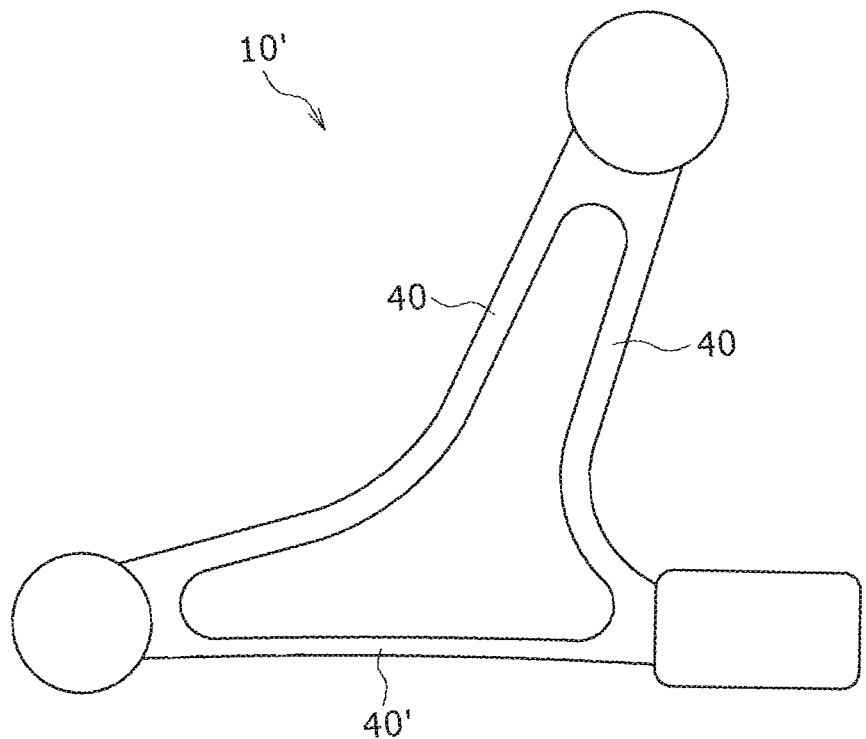
FIG. 13 is a schematic diagram illustrating the automobile undercarriage component according to an embodiment (modification) of the present invention.

Further, as illustrated in FIG. 13, the whole rib may be formed of the second section 40'. A plurality of such ribs may exist in an undercarriage component 10.

Furthermore, the rib is not limited to the one that protrudes in the direction orthogonal to the web. The rib may protrude, for example, in a direction oblique to the web. More specifically, the planar portion of the rib need not always be parallel to the surface of the web. In such an instance, the inclination angle of each wall surface for determination, for instance, of w may be determined as the inclination angle of each wall surface in a direction orthogonal to the planar portion of the rib.

The relationship between the structure of the rib and the strength and rigidity of the rib will now be described with reference to FIGS. 6 and 7.

[Relationship between Rib Structure and Strength/Rigidity]

(Method of Calculating the Second Moment of Area and Modulus of Section)

Figure 6:
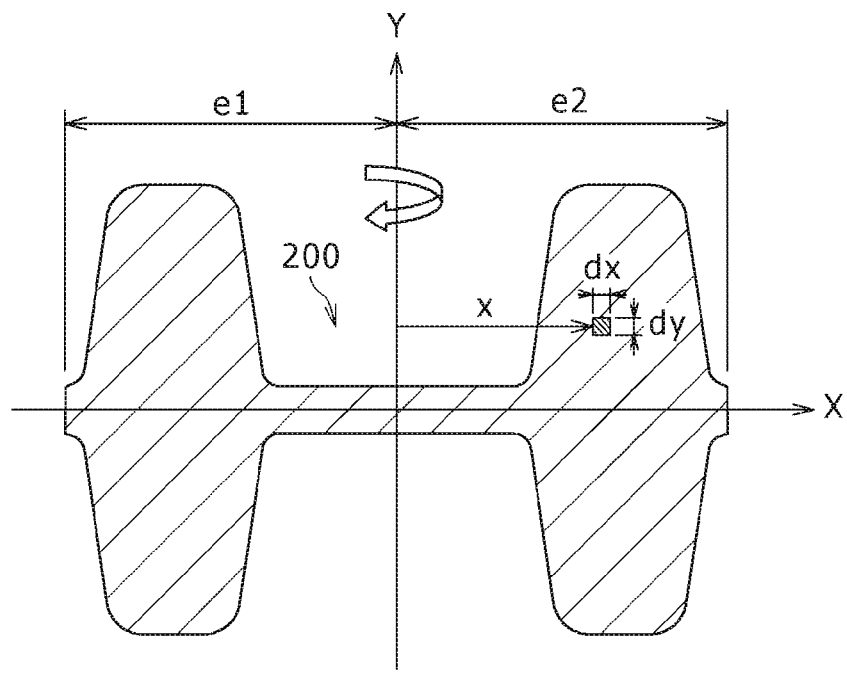
FIG. 6 is a cross-sectional view of the arm that is used to calculate the second moment of area and the modulus of section.

FIG. 6 is a cross-sectional view of an arm that is used to calculate the second moment of area and the modulus of section.

The second moment of area I (I around the Y-axis which is a neutral axis passing through the center of FIG. 6) of the arm 200 having the illustrated cross-section is expressed by Equation 10 below.

$$I = \iint_A x^2 \, dx \, dy \qquad \text{[Equation 10]}$$

When the value of the second moment of area I decreases, the rigidity (the rigidity against external force applied in the direction of the arrow in FIG. 6) or the arm 200 decreases.

Meanwhile, the modulus of section Z of the arm 200 is expressed by Equation 11 below.

$$Z_1 = I/e_1, Z_2 = I/e_2 \qquad \text{[Equation 11]}$$

In Equation 11, $e_1$ is the distance from the neutral axis (Y-axis in FIG. 6) to the farthest portion of the cross-section, and $e_2$ is the distance from the neutral axis to the farthest portion of the cross-section that is in a direction opposite from $e_1$. The cross-section of the arm 200 is a point-symmetric figure and $e_1 = e_2$. Thus, $Z = Z_1 = Z_2$. When the value of the modulus of section Z decreases, stress generated in the cross-section increases to decrease the strength (the strength against the external force applied in the direction of the arrow in FIG. 6) of the arm 200.

(When Cross-Section of Arm is Assumed to be Shaped Like Letter H)

Figure 7:
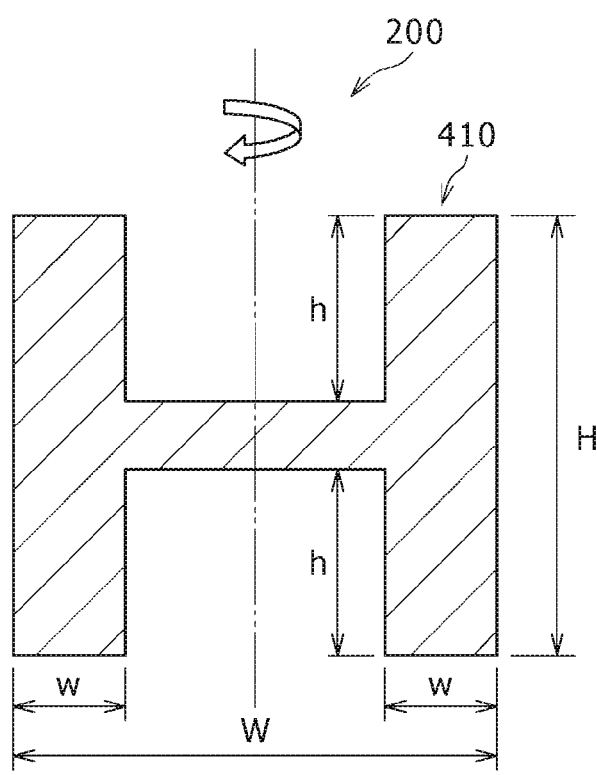
FIG. 7 is a cross-sectional schematic view of the arm that is obtained when a cross-section is assumed to be shaped like the letter H so as to facilitate the calculation of the second moment of area and the modulus of section.

FIG. 7 is a cross-sectional schematic view of the arm that is obtained when the cross-section is assumed to be shaped like the letter H so as to facilitate the calculation of the second moment of area and the modulus of section. The second moment of area I (I around an axis represented by the one-dot chain line in FIG. 7) of the arm 200 having the illustrated cross-section is expressed by Equation 12 below.

$$I = \{HW^3 - 2h(W-2w)^3\}/12 \qquad \text{[Equation 12]}$$

When the value of the second moment of area I decreases, the rigidity (the rigidity against external force applied in the direction of the arrow in FIG. 7) of the arm 200 decreases.

Meanwhile, the modulus of section Z of the arm 200 is expressed by Equation 13 below.

$$Z = \{HW^3 - 2h(W-2w)^3\}/(6W) \qquad \text{[Equation 13]}$$

When the value of the modulus of section Z decreases, the strength (the strength against the external force applied in the direction of the arrow in FIG. 7) of the arm 200 decreases.

W is the width of the arm 200, w is the width of a rib 410, H is the overall height of the arm 200, and h is the height of the rib 410.

According to the equations for calculating the second moment of area I and the modulus of section Z when the cross-section of the arm is assumed to be shaped like the letter H, a decrease in I and Z can be obviously suppressed to a greater degree when the width w of the rib 410 is decreased without changing the width W of the arm 200 than when the width W of the arm 200 is decreased.

The second section of the rib of the undercarriage component according to the embodiment of the present invention is configured so that the width of the rib is decreased without changing the width of the arm. This makes it possible to decrease the cross-sectional area of the arm while suppressing a decrease in the second moment of area I and in the modulus of section Z. That is to say, the undercarriage component according to the embodiment of the present invention is capable of reducing the overall weight of the undercarriage component while suppressing a decrease in the strength and rigidity of the undercarriage component.

The relationship between the structure of the rib and stress to a die will now be described with reference to FIG. 8 (and with reference as needed to FIGS. 3 and 4).

[Relationship between Structure of Rib and Stress to Die]

In order to reduce the weight of the undercarriage component, it is necessary, as described above, to decrease the width w' wa'+wb'+ws') of the second section 40' of the rib 4 illustrated in FIG. 4. To decrease the width w of the second section 40', it is not only necessary to ensure that ws'=0, but also necessary to minimize wa' and wb'. Here, wa' and wb' can be decreased by decreasing the curvature radius Ra' of the angular portion 42' and the curvature radius Rb' of the angular portion 44'.

However, when the rib with an angular portion having a small curvature radius is to be press-formed with a die, stress concentrates on an angular portion of the die. This causes the die to crack easily, thereby shortening its life.

Therefore, if the curvature radius of the angular portion of the rib is decreased in order to reduce the weight of the undercarriage component, the life of the die shortens. This involves additional costs for repairing the die or fabricating a new die, resulting in an increased manufacturing cost.

The inventors of the present invention have conducted intensive studies on the relationship between the structure of a rib and stress applied to a die press-forming the rib, and found that the stress applied to the angular portion of the die is affected by not only the curvature radius of the angular portion of the rib, but also the height of the rib.

Figure 8:
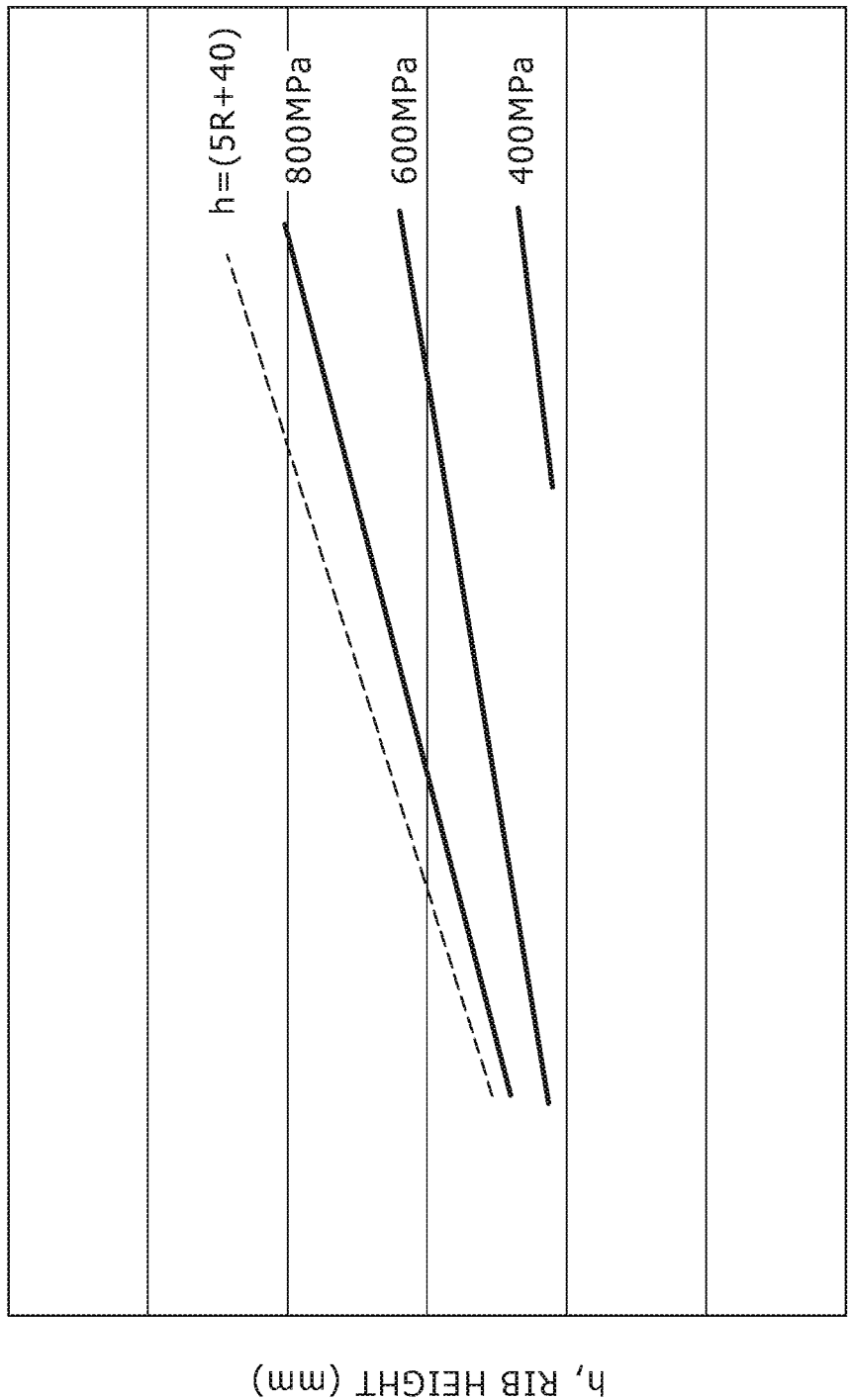
FIG. 8 is a graph illustrating stress contour lines of stress that is developed on an angular portion of a die when the automobile undercarriage component according to the embodiment of the present invention is manufactured.

More specifically, as illustrated in FIG. 8, the inventors have found that stress contour lines developed on the angular portion of the die are affected not only by the curvature radius R of the angular portion of the rib (horizontal axis) but also by the height h of the rib (vertical axis). Additionally, FIG. 8 indicates that when the height of the rib is fixed, the stress applied to the angular portion of the die increases with a decrease in the curvature radius R of the angular portion of the rib (horizontal axis), and that when the curvature radius R of the angular portion of the rib (horizontal axis) is fixed, the stress increases with an increase in the height of the rib.

The probability of die cracking depends partly on the material for the die. However, the probability of cracking increases when a stress of 1000 MPa or higher is applied to the angular portion of the die. More specifically, the inventors have found that the threshold of cracking is at a position (h=(5R+40)) slightly above an 800-MPa stress contour line in FIG. 8. That is, when the relationship between the height h of the rib and the curvature radius R of the angular portion of the rib is above the position indicated by the equation h=(5R+40) in FIG. 8, the probability of die cracking is high. In other words, when the relational expression h<(5R+40) is satisfied by the relationship between the height h of the rib and the curvature radius R of the angular portion of the rib, the occurrence of die cracking can be suppressed.

If, for instance, the height h of the rib needs to be set to 50 mm in order to meet strength and other requirements, the relational expression h<(5R+40) indicates that the occurrence of die cracking can be suppressed when the curvature radius R of the angular portion of the rib is set to a value greater than 2 mm (R>2). Further, if the height h of the rib needs to be set to 60 mm, the aforementioned relational expression indicates that the occurrence of die cracking can be suppressed when the curvature radius R of the angular portion of the rib is set to a value greater than 4 mm (R>4). Meanwhile, if the curvature radius R of the angular portion of the rib is to be set to 1 mm, the aforementioned relational expression indicates that the height h of the rib is preferably set to a value smaller than 45 mm (h<45). In order to properly suppress the occurrence of die cracking and provide properties more suitable for actual applications, the curvature radius of the angular portion of the rib is preferably between 1 mm and 10 mm.

If two angular portions of the rib differ in curvature radius, more specifically, if the curvature radius Ra' of the angular portion 42 in FIG. 4 is smaller than the curvature radius Rb' of the angular portion 44' (Ra'<Rb'), the curvature radius of the angular portion that is likely to cause die cracking, that is, the smaller curvature radius Ra', should be substituted into the aforementioned relational expression for determination purposes.

The automobile undercarriage component according to the embodiment of the present invention is as described above. However, when the present invention is to be embodied, the configuration of the automobile undercarriage component may be changed as far as the configuration is not adversely affected. For example, FIGS. 3 and 4 indicate that the shapes of the cross-sections of upper and lower ribs 40 are symmetrical with respect to the web 3. Alternatively, however, the shapes of such cross-sections may be unsymmetrical.

Further, the rib of the undercarriage component is supposed to include at least the first section and the second section.

If, for example, the strength and rigidity of the undercarriage component meet the requirements of the undercarriage component, the outer wall surface may be disposed in proximity to the inner wall surface in such a manner that the rib includes a "third section," which is narrower than the first section.

Moreover, the rib may include a "fourth section," which is narrower than the first section and wider than the second section, and a "fifth section," which is narrower than the second section.

Additionally, as for a portion that causes a significant decrease in strength or rigidity when the inner wall surface is disposed in considerable proximity to the outer wall surface (or the outer wall surface is disposed in considerable proximity to the inner wall surface), the height of the rib may be increased to suppress a decrease in strength and rigidity without increasing the overall weight of the undercarriage component.

Figure 9:
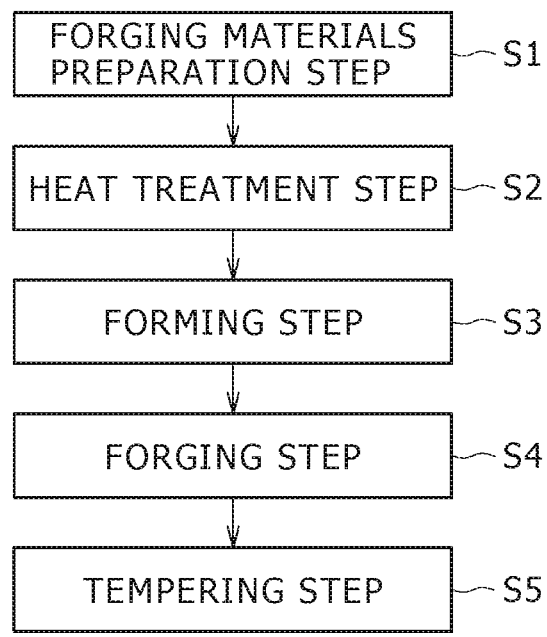
FIG. 9 is a flowchart illustrating a method of manufacturing the automobile undercarriage component according to the embodiment of the present invention.

Referring to FIG. 9, a method of manufacturing the automobile undercarriage component according to the embodiment of the present invention will now be described with reference to a case where an aluminum alloy is used.

[Method of Manufacturing Automobile Undercarriage Component]

As illustrated in FIG. 9, the method of manufacturing the automobile undercarriage component according to the embodiment of the present invention includes, for example, a forging step S4. Before the forging step S4, a forging materials preparation step S1, a heat treatment step S2, and a forming step S3 may be performed. After the forging step S4, a tempering step S5 may be performed.

(Forging Materials Preparation Step)

The forging materials preparation step S1 is a step of preparing forging materials. Here, the forging materials include a forging billet, an extrusion material, and a shaped ingot. The forging materials preparation step S1 includes a cutting step in which cutting is performed to obtain a predetermined length.

(Heat Treatment Step)

The heat treatment step S2 is a step of performing a homogenization process on the forging materials.

When the homogenization process is performed on the forging materials, an intermetallic compound crystallized during casting is diffused and dissolved to incur microstructure homogenization. The homogenization process in the heat treatment step S2 may be performed in a heating furnace under publicly-known conventional conditions. As the heating furnace, an air furnace, an induction heating furnace, a niter furnace, or other publicly-known conventional furnace may be used.

(Forming Step)

The forming step S3 is a step of forming heat-treated forging materials. In the forming step S3, for example, roll forming or bending may be performed. Roll forming is a method of forming the forging materials into a stepped roll-formed member by using a roll forming machine. If, for instance, a component that is not shaped like the letter I, such as an L-shaped suspension arm, is to be manufactured, bending is performed subsequently to roll forming. Bending may be performed by placing a roll forming member on a V-shaped die (bending die) and bending the roll forming member to a desired angle by pressing a punch against the roll forming member from above.

(Forging Step)

The forging step S4 is a step of press-forming the forging materials with a die. Press forming in the forging step S4 may be accomplished by preparing a die designed to shape the forging materials into an undercarriage component having the aforementioned shape and conducting press forming with the prepared die.

The forging materials are metal materials that are to be forged, and may be formed forging materials subjected to steps S1, S2, and S3, extrusion materials, or shaped ingots.

(Tempering Step)

The tempering step S5 is a step of performing a tempering process on the forging materials that have been forged. More specifically the tempering step S5 is a step of solutionizing, quenching, and age-hardening the forging materials. After completion of the forging step S4, a tempering process, such as T6 or T7, is performed in order to obtain required strength, toughness, and corrosion resistance. T6 is an artificial aging process that is performed to obtain the maximum strength after completion of solutionizing and quenching processes. T7 is an excessive age-hardening process that is performed under artificial aging process conditions in order to obtain the maximum strength after completion of solutionizing and quenching processes.

The solutionizing process may be performed under normal conditions, namely, while the temperature is maintained within a range, for example, of 520 to 570° C. for a period of 1 to 7 hours. The solutionizing process may be performed by using an air furnace, an induction heating furnace, a niter furnace, or other publicly-known conventional furnace. The quenching process may be performed under publicly-known conventional conditions.

The age-hardening process may be performed under normal conditions, namely by selecting, for example, T6 or T7 tempering process conditions from a temperature range of 160 to 220° C. and from a holding period range of 2 to 24 hours. The age-hardening process may also be performed by using an air furnace, an induction heating furnace, a niter furnace, or other publicly-known conventional furnace.

The method of manufacturing the automobile undercarriage component according to the embodiment of the present invention is as described above. However, the present invention may be embodied by including another step between, before, or after the aforementioned steps. For example, a through-hole drilling step may be included subsequently to the forging step S4.

Further, publicly-known conventional conditions may be obviously applied as conditions that are not specifically defined for the aforementioned steps. Furthermore, the conditions for the aforementioned steps may be modified as appropriate as far as advantageous effects are obtained from the aforementioned steps.

Examples

The automobile undercarriage component according to the present invention will now be described in detail by indicating the dimensions of each element of the rib.

Figure 14:
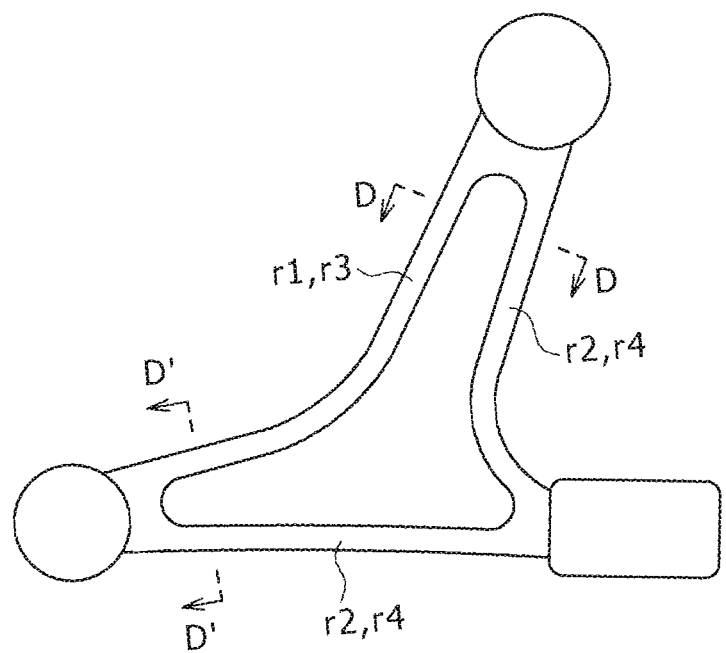
FIG. 14 is a schematic diagram illustrating the automobile undercarriage component that is used to describe the embodiment.
Figure 15:
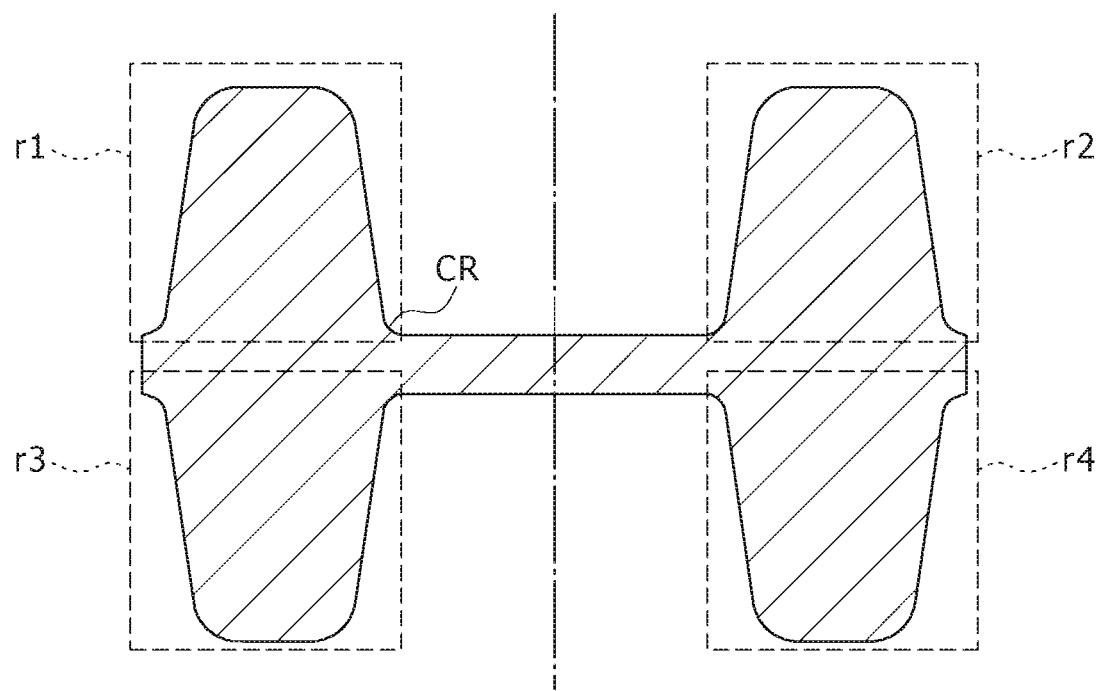
FIG. 15 is a cross-sectional view of the arm of the automobile undercarriage component that is used to describe the embodiment and taken along line D-D and line D'-D' of FIG. 14.

Table 1 specifically indicates the dimensions of the first, second, and third sections of the rib, which are illustrated in FIGS. 14 and 15. As described in conjunction with the foregoing embodiment, the second section is configured so that the inner wall surface is disposed in proximity to the outer wall surface, and the third section is configured so that the outer wall surface is disposed in proximity to the inner wall surface.

Ribs 1-4 in Table 1 correspond to r1-r4 in FIGS. 14 and 15, and a fillet R in Table 1 denotes the curvature radius CR of a base end section of the rib illustrated in FIG. 15.

Symbols in Table 1, such as θa, θb, θa', θb', Ra, Rb, Ra', Rb', w, and w', correspond to those described in conjunction with the foregoing embodiment.

The modulus of section and the second moment of area in Table 1 are calculated according to the calculation method (the method based on FIG. 6) described in conjunction with the foregoing embodiment while the one-dot chain line in FIG. 15 is regarded as the central axis. Test samples No. 0 to 10 are all formed of an aluminum alloy

TABLE 1

| | | 0 (conventional technology) | 1 | 2 | 3 | 4 | 5 | 6 | 7 | 8 | 9 | 10 |
|---|---|---|---|---|---|---|---|---|---|---|---|---|
| First section | θa, θb, θa', θb' (°) | 5 | 5 | 5 | 5 | 5 | 5 | 5 | 5 | 4 | 5 | 5 |
| | Ra (mm) | 4 | 4 | 4 | 4 | 4 | 4 | 4 | 4 | 4 | 4 | 4 |
| | Rb (mm) | 4 | 4 | 4 | 4 | 4 | 4 | 4 | 4 | 4 | 4 | 4 |
| | wa (mm) | 3.67 | 3.67 | 3.67 | 3.67 | 3.67 | 3.67 | 3.67 | 3.67 | 3.73 | 3.67 | 3.67 |
| | wb (mm) | 3.67 | 3.67 | 3.67 | 3.67 | 3.67 | 3.67 | 3.67 | 3.67 | 3.73 | 3.67 | 3.67 |
| | ws (mm) | 0.00 | 0.00 | 0.00 | 0.00 | 0.00 | 0.00 | 0.00 | 1.00 | 0.00 | 0.00 | 0.00 |
| | Rib width (w = wa + wb + ws) (mm) | 7.33 | 7.33 | 7.33 | 7.33 | 7.33 | 7.33 | 7.33 | 8.33 | 7.46 | 7.33 | 7.33 |
| | Rib height (mm) | 20.00 | 20.00 | 20.00 | 20.00 | 20.00 | 20.00 | 20.00 | 20.00 | 20.00 | 20.00 | 20.00 |
| Second/third section | Ra' (mm) | — | 3 | 3 | 3 | 2 | 2 | 1 | 3 | 3 | 3 | 3 |
| | Rb' (mm) | — | 3 | 2 | 1 | 2 | 1 | 1 | 3 | 3 | 3 | 3 |
| | wa' (mm) | — | 2.75 | 2.75 | 2.75 | 1.83 | 1.83 | 0.92 | 2.75 | 2.80 | 2.75 | 2.75 |
| | wb' (mm) | — | 2.75 | 1.83 | 0.92 | 1.83 | 0.92 | 0.92 | 2.75 | 2.80 | 2.75 | 2.75 |
| | ws' (mm) | — | 0.00 | 0.00 | 0.00 | 0.00 | 0.00 | 0.00 | 1.00 | 0.00 | 0.00 | 0.00 |
| | Rib width (w' = wa' + wb' + ws') (mm) | — | 5.50 | 4.58 | 3.67 | 3.67 | 2.75 | 1.83 | 6.50 | 5.60 | 5.50 | 5.50 |
| | Rib height (mm) | — | 22.3 | 23.8 | 25.9 | 25.9 | 28.4 | 31.6 | 22.3 (2nd) 25.4 (3rd) | 22.3 | 20.0 | 20.0 |
| | Difference L in rib width between first section and second/third section (mm) | — | 1.8 | 2.7 | 3.7 | 3.7 | 4.6 | 5.5 | 1.8 | 1.9 | 1.8 | 1.8 |
| | Second section Amount to be in proximity to outside (mm) | — | 1.8 | 2.7 | 3.7 | 3.7 | 4.6 | 5.5 | 1.8 | 1.9 | 1.8 | 0.0 |
| | Third section Amount to be in proximity to inside (mm) | — | 0.0 | 0.0 | 0.0 | 0.0 | 0.0 | 0.0 | 1.8 | 0.0 | 0.0 | 1.8 |
| Shape prerequisites | Web thickness (mm) | | | | | | 6 | | | | | |
| | Fillet R (mm) | | | | | | R10 | | | | | |
| | Arm width (mm) | | | | | | 60 | | | | | |
| Rib 1 | Percentage of first section (%) | 100 | 0 | 0 | 0 | 0 | 0 | 0 | 0 | 0 | 0 | 0 |
| | Percentage of second section (Percentage to be in proximity to outside) (%) | 0 | 100 | 100 | 100 | 100 | 100 | 100 | 80 | 100 | 100 | 0 |
| | Percentage of third section (Percentage to be in proximity to inside) (%) | 0 | 0 | 0 | 0 | 0 | 0 | 0 | 20 | 0 | 0 | 100 |
| Rib 2/3/4 | Percentage of first section (%) | 100 | 100 | 100 | 100 | 100 | 100 | 100 | 100 | 100 | 100 | 100 |
| | Percentage of second/third section (%) | 0 | 0 | 0 | 0 | 0 | 0 | 0 | 0 | 0 | 0 | 0 |

TABLE 1-continued

| | | | 0 (conventional technology) | 1 | 2 | 3 | 4 | Test sample No. 5 | 6 | 7 | 8 | 9 | 10 |
|---|---|---|---|---|---|---|---|---|---|---|---|---|---|
| Strength | Modulus of section | (mm²) | | | | | 16038 | | | | | 15652 | 15233 |
| Rigidity | Second moment of area | (mm²) | | | | | 481149 | | | | | 469550 | 456987 |
| Cross-sectional area | Cross-sectional area | (mm²) | 1006 | 997 | 993 | 989 | 989 | 987 | 985 | 1002 | 983 | 977 | 976 |
| | Percentage of cross-sectional area change (as compared to conventional percentage) | (%) | 0.0% | −0.9% | −1.3% | −1.6% | −1.8% | −1.9% | −2.1% | −0.3% | −2.3% | −2.9% | −2.9% |
| Weight reduction effect | Whole arm Mass | (g) | 2000 | 1985 | 1978 | 1973 | 1973 | 1968 | 1965 | 1995 | 1961 | 1952 | 1951 |
| | Percentage of mass change (as compared to conventional percentage) | (%) | 0.0% | −0.8% | −1.1% | −1.4% | −1.4% | −1.6% | −1.8% | −0.3% | −1.9% | −2.4% | −2.5% |
| | Rib/web* Mass | (g) | 1700 | 1685 | 1678 | 1673 | 1673 | 1668 | 1665 | 1695 | 1661 | 1652 | 1651 |
| | Percentage of mass change (as compared to conventional percentage) | (%) | 0.0% | −0.9% | −1.3% | −1.6% | −1.6% | −1.9% | −2.1% | −0.3% | −2.3% | −2.9% | −2.9% |

*Whole arm less boss

[Studies of Results]

As shown in Table 1, test sample No. 9 includes the second section. Therefore, when it is compared against test sample No. 0, which is representative of a conventional technology, Table 1 indicates that the weight of the whole arm is reduced by 2.4% (by 2.9% if only the rib and web are taken into account. It signifies that weight reduction can be achieved.

Further, test sample No. 9 includes the second section, which is shaped so that the inner wall surface is disposed in proximity to the outer wall surface, and test sample No. 10 includes the third section, which is shaped so that the outer wall surface is disposed in proximity to the inner wall surface. Thus, a comparison between test samples No. 9 and No. 10 indicates that it is possible to reduce the amount of decrease in the modulus of section and in the second moment of area. In other words, the results derived from test sample No. 9 indicate that the present invention achieves weight reduction while suppressing a decrease in strength and rigidity.

Test samples No. 1 to 8 have a rib that is narrower than the rib of test sample No. 0. Further, the height of the rib of test samples No. 1 to 8 is changed so that test samples No. 1 to 8 are equal to test sample No. 0 in the values of the modulus of section and the second moment of area. However, it is found that the effect of weight reduction can be adequately achieved even when the height of the rib is increased. Furthermore, the results derived from test sample No. 7 indicate that the effect of weight reduction can be achieved even when the third section whose outer wall surface is disposed in proximity to the inner wall surface is included.

The above-described effects can be obtained not only from a component formed of an aluminum alloy but also from a product formed of cast iron.

REFERENCE SIGNS LIST

1 . . . Boss
2 . . . Arm
3 . . . Web
4 . . . Rib
10 . . . Automobile undercarriage component (undercarriage component)
40 . . . First section of rib (first section)
40' . . . Second section of rib (second section)
41, 41' . . . First inner wall surface, second inner wall surface (inner wall surface)
42, 42' . . . Angular portion of first section, angular portion of second section (angular portion)
43, 43' . . . First outer wall surface, second outer wall surface (outer wall surface)
44, 44' . . . Angular portion of first section, angular portion of second section (angular portion)
45, 45' . . . Planar portion of first section, planar portion of second section (planar portion)
S1 . . . Forging materials preparation step
S2 . . . Heat treatment step
S3 . . . Forming step
S4 . . . Forging step
S5 . . . Tempering step

The invention claimed is:

1. An automobile undercarriage component comprising:
an elongated arm comprising a web; and
a rib connected to the web in a direction parallel to the plane of the web and transverse to the direction of elongation of the web, the rib having an inner wall surface extending from the rib to terminate at a leading end which is the end of the rib farthest from the web in a direction perpendicular to the plane of the web;
wherein the rib includes a first section and a second section which are respectively arranged along the direction of elongation of the arm, wherein the second section is located adjacent a distal end of the arm in the direction of elongation and is arranged closer to the distal end than is the first section, a leading end of the second section having a width in the direction parallel to the plane of the web and transverse to the direction of elongation of the arm which is narrower than the width of a leading end of the first section, as an inner wall surface is disposed closer to an opposing outer wall surface in the second section as compared to the first section;
wherein the first section includes a first inner wall surface formed and a first outer wall surface opposing the first inner wall surface, the first inner wall surface having an inclination angle θ of θa (°), an angular portion formed on the leading end of the first inner wall surface having a curvature radius R of Ra (mm), the first outer wall surface having an inclination angle θ of θb (°), an angular portion formed on the leading end of the first outer wall surface having a curvature radius R of Rb (mm), and a planar portion formed between the two angular portions having a width of ws (mm);
wherein the second section includes a second inner wall surface and a second outer wall surface, the second inner wall surface having an inclination angle θ of θa' (°), an angular portion formed on the leading end of the second inner wall surface having a curvature radius R of Ra' (mm), the second outer wall surface having an inclination angle θ of θb' (°), an angular portion formed on the leading end of the second outer wall surface having a curvature radius R of Rb' (mm), and a planar portion formed between the two angular portions having a width of ws' (mm); and
wherein, when wa, wb, wa', and wb' are defined to satisfy the equations wa=Ra×cos θa−(Ra−Ra×sin θa)×tan θa, wb=Rb×cos θb−(Rb−Rb×sin θb)×tan θb, wa'=Ra'×cos θa'−(Ra'−Ra'×sin θa')×tan θa', and wb'=Rb'×cos θb'−(Rb'−Rb'×sin θb')×tan θb', the difference L (mm) in width between the first section and the second section is expressed by the equation L={(wa−wa')+(wb−wb')+(ws−ws')} and L>0.

2. The automobile undercarriage component according to claim 1, wherein the angular portions have a curvature radius R of 1 to 10 mm.

3. The automobile undercarriage component according to claim 1, wherein, when the smaller curvature radius R of the two angular portions of the rib is used as the value of R (mm), the height h (mm) of the rib is h<(5R+40).

4. The automobile undercarriage component according to claim 2, wherein, when the smaller curvature radius R of the two angular portions of the rib is used as the value of R (mm), the height h (mm) of the rib is h<(5R+40).

5. The automobile undercarriage component according to claim 1, wherein the width ws of the planar portion of the first section and the width ws' of the planar portion of the second section are both less than 2 mm.

6. The automobile undercarriage component according to claim 1, wherein the automobile undercarriage component is formed of an aluminum alloy.

7. The automobile undercarriage component according to claim 2, wherein the width ws of the planar portion of the first section and the width ws' of the planar portion of the second section are both less than 2 mm.

8. The automobile undercarriage component according to claim 2, wherein the automobile undercarriage component is formed of an aluminum alloy.

9. The automobile undercarriage component according to claim 1,
wherein the ratio of the width of the leading end of the second section to the leading end of the first section is in a range of 0.24-0.76.

10. The automobile undercarriage component according to claim 1, further comprising a boss at the distal end of the arm.

* * * * *